Nov. 13, 1951 W. M. WATKINS, JR 2,575,081
ADJUSTING MECHANISM FOR TEMPERATURE REGULATORS
Filed April 7, 1950 5 Sheets-Sheet 1
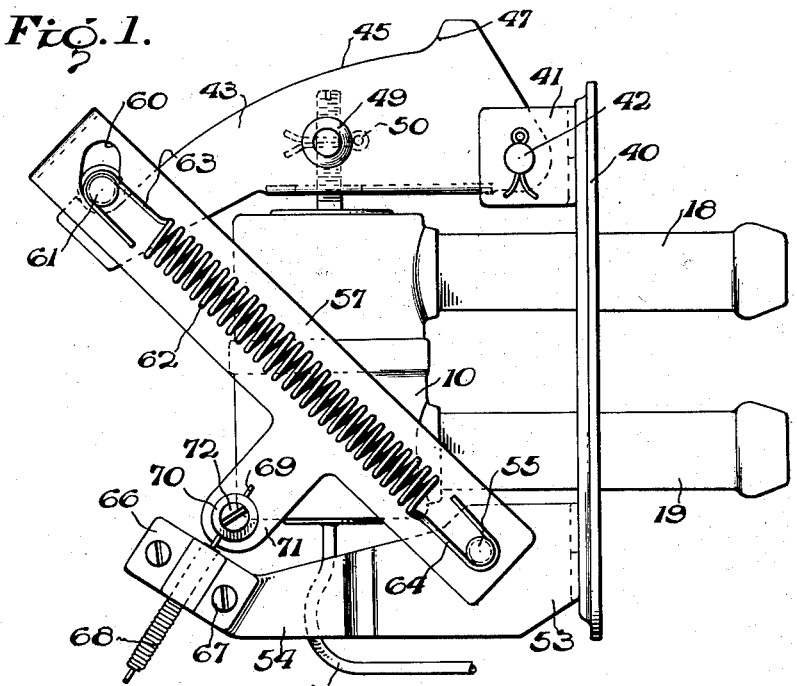
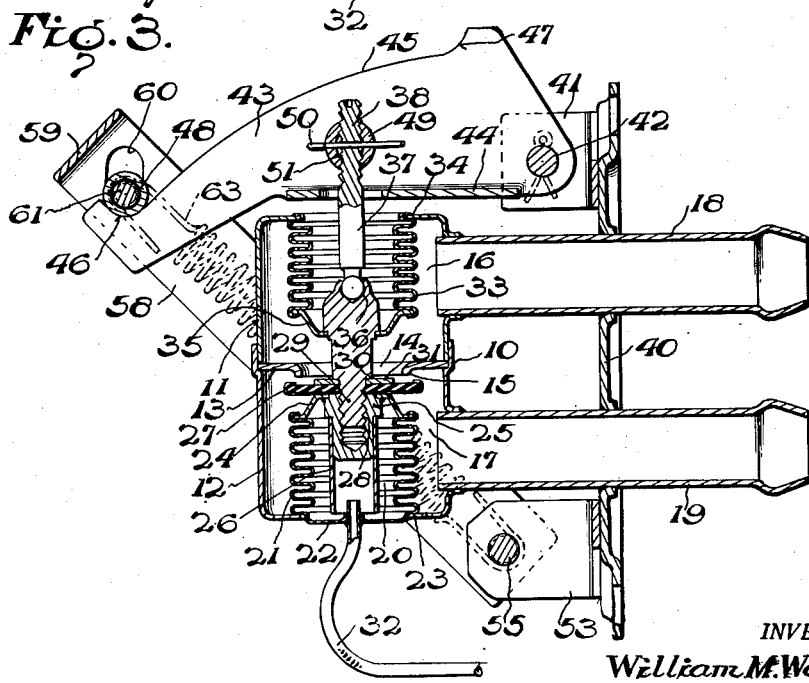
INVENTOR.
William M. Watkins, Jr.
BY
Cameron, Kerkam + Sutton
Attorneys Nov. 13, 1951  W. M. WATKINS, JR  2,575,081
ADJUSTING MECHANISM FOR TEMPERATURE REGULATORS
Filed April 7, 1950  5 Sheets-Sheet 2

INVENTOR.
William M. Watkins, Jr.
BY
Cameron, Kerkam + Sutton
Attorneys

Nov. 13, 1951   W. M. WATKINS, JR   2,575,081
ADJUSTING MECHANISM FOR TEMPERATURE REGULATORS
Filed April 7, 1950   5 Sheets-Sheet 3

INVENTOR.
William M. Watkins, Jr.
BY
Cameron, Kerkam + Sutton
Attorneys

Nov. 13, 1951 W. M. WATKINS, JR 2,575,081
ADJUSTING MECHANISM FOR TEMPERATURE REGULATORS
Filed April 7, 1950 5 Sheets-Sheet 4
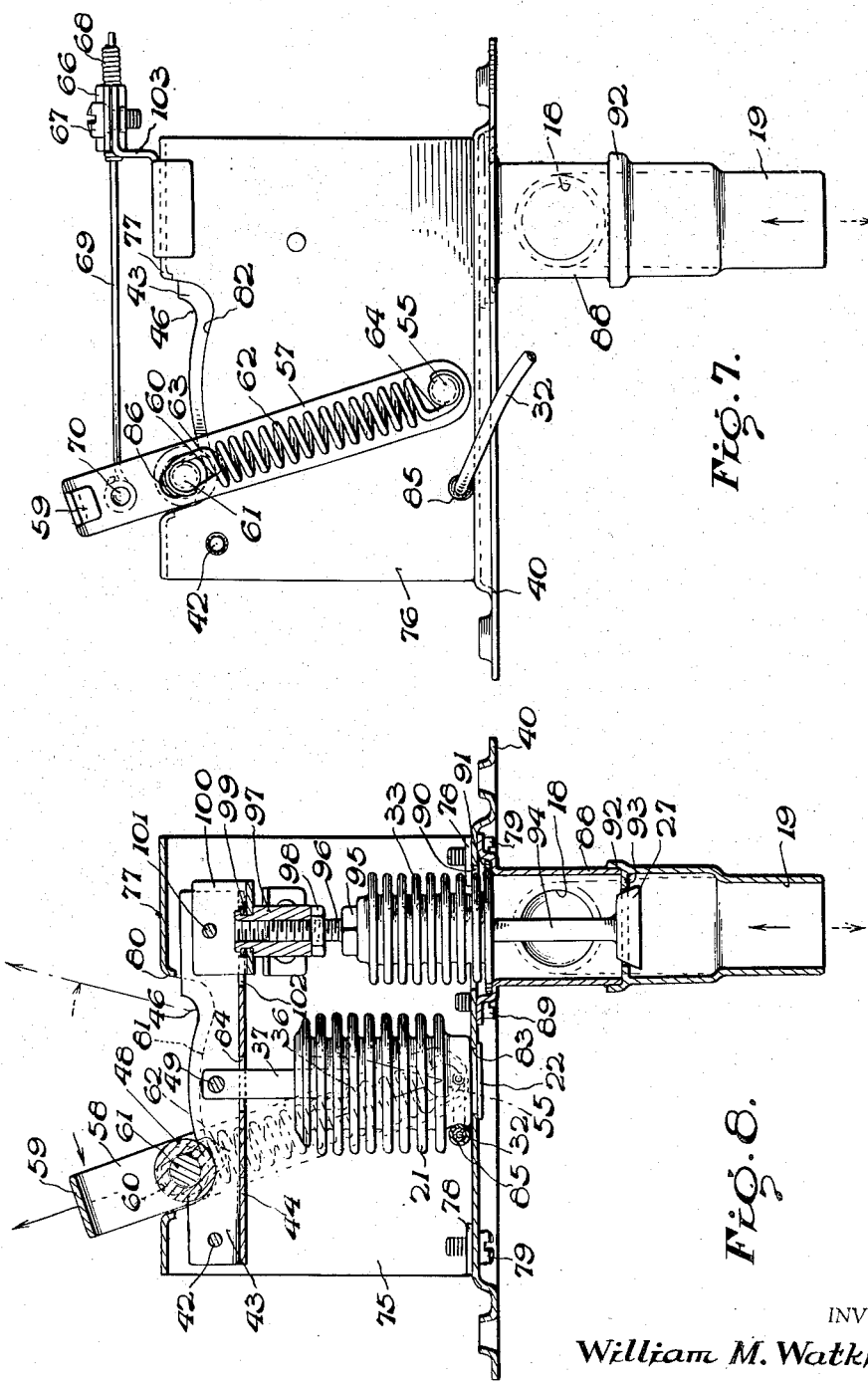
INVENTOR
William M. Watkins, Jr.
BY Cameron, Kerkam + Sutton
ATTORNEYS

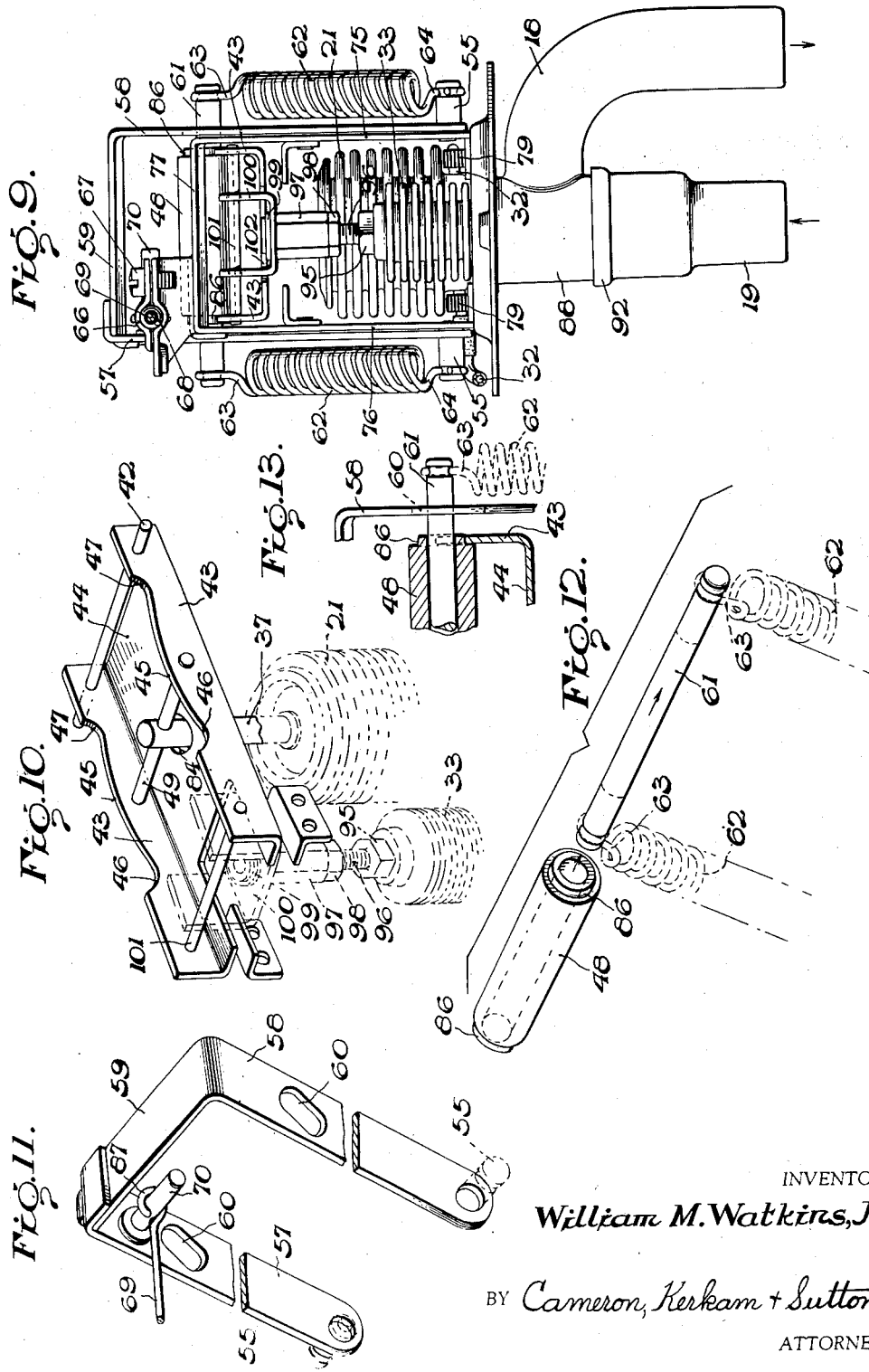

Patented Nov. 13, 1951

2,575,081

UNITED STATES PATENT OFFICE 2,575,081

ADJUSTING MECHANISM FOR TEMPERATURE REGULATORS

William M. Watkins, Jr., Knoxville, Tenn., assignor to Robertshaw-Fulton Controls Company, Knoxville, Tenn., a corporation of Delaware Application April 7, 1950, Serial No. 154,695
In Canada July 20, 1949

10 Claims. (Cl. 236—99)

This invention relates to temperature regulators, and more particularly to a temperature regulator having improved means for manually setting the regulator so as to predetermine the temperature to be maintained. The invention has particular utility when applied to a regulator for controlling the temperature within a motor or comparable vehicle, and therefore it will be illustrated and explained in conjunction with a regulator of that type, but it is to be expressly understood that the invention is not limited to such use, as it can be applied to a wide variety of regulators intended for ready manual adjustment.

Heating systems for the interiors of automobiles and the like commonly employ provisions for circulating a heating medium, such as the heated medium flowing in the cooling system of the engine, through a suitable heat exchanger suitably disposed with respect to the interior space of the automobile, and in order to maintain the approximate temperature desired, it has been proposed to include in the system a thermostatically operated valve for controlling the flow of such medium, the thermostat responding to the temperature interiorly of the automobile to vary the position of the valve and therefore the rate of flow of the heating medium. Temperature regulators of this character are desirably made easily adjustable so that the temperature may be varied readily to conform with the desires of different occupants at different times, and in order that the temperature may be adjusted when only the driver is present, the provision for adjustment should be such that it may be disposed conveniently to the driver's position in the car even though this may be at some distance from the position at which the regulator is desirably located.

It is an object of this invention to provide a temperature regulator with improved provisions for manually adjusting the same which may be disposed relatively remote from the regulator itself and in various positions with respect thereto.

Another object of this invention is to provide an improved device of the type characterized wherein the provisions for adjustment are simple in construction, composed of parts which are inexpensive to manufacture and assemble, and certain in operation.

Another object of this invention is to provide an improved regulator of the type characterized wherein the adjustment of the regulator is effected simply by a member which may be operated by a push or a pull to its several positions of adjustment.

In the adjustment of temperature regulators it has been common practice to effect the adjustments by applying varying tensions to a spring that imposes a load on the thermostat, using a rotatable screw threaded member for effecting the compression and extension of the spring. If, as desirable, the manually manipulatable member has indicating means associated therewith the adjustment of the tension of the spring is of necessity limited to not more than one complete revolution of the rotatable screw threaded member. If the range of adjustment is to be relatively large, as say on the order of 40° F., this means that particular temperatures to be maintained can be picked out only by relatively fine adjustment of the rotatable member. It is an object of this invention to provide a regulator of the type characterized wherein a relatively large range of adjustment is provided without necessity for nice setting of the manually manipulatable member.

Another object of this invention is to provide an improved regulator as characterized wherein the force required to move the manually adjustable member will remain substantially constant throughout the entire range of adjustment.

Another object of this invention is to provide an improved regulator of the type characterized wherein a Bowden wire may be used for effecting the adjustment.

Other objects of the invention will appear as the description of the invention proceeds.

This application is a continuation in part of my copending application Serial Number 49,106 filed September 13, 1948 (now abandoned).

The invention is capable of receiving a variety of mechanical expressions two of which have been illustrated on the accompanying drawings, and it is therefore to be expressly understood that the drawings are for purposes of illustration only, and are not to be construed as a definition of the limits of the invention, reference being had to the appended claims for that purpose.

Referring in detail to the accompanying drawings wherein the same reference characters are used to designate corresponding parts in the several figures:

Fig. 1 is a side elevation of an improved regulator embodying the present invention;

Fig. 3 is a vertical section through said regulator;

Fig. 7 is a side elevation of another embodiment of an improved regulator embodying the present invention;

Fig. 8 is a vertical section through the embodiment of Fig. 7;

Fig. 9 is a view of the embodiment of Fig. 7 as seen from the right therein;

Fig. 10 is an enlarged detail of a part of the embodiment of Fig. 7 showing the track member employed therein;

Fig. 11 is an enlarged detail of a part of the embodiment of Fig. 7 showing the arrangement of the slots in the rotatable arms;

Fig. 12 is an expanded view of a part of the embodiment of Fig. 7 showing the roller for engaging the track member; and Fig. 13 is an enlarged view partly in section of a part of the embodiment of Fig. 7 showing the arrangement of roller, track, arm and tension spring.

Figure 2:
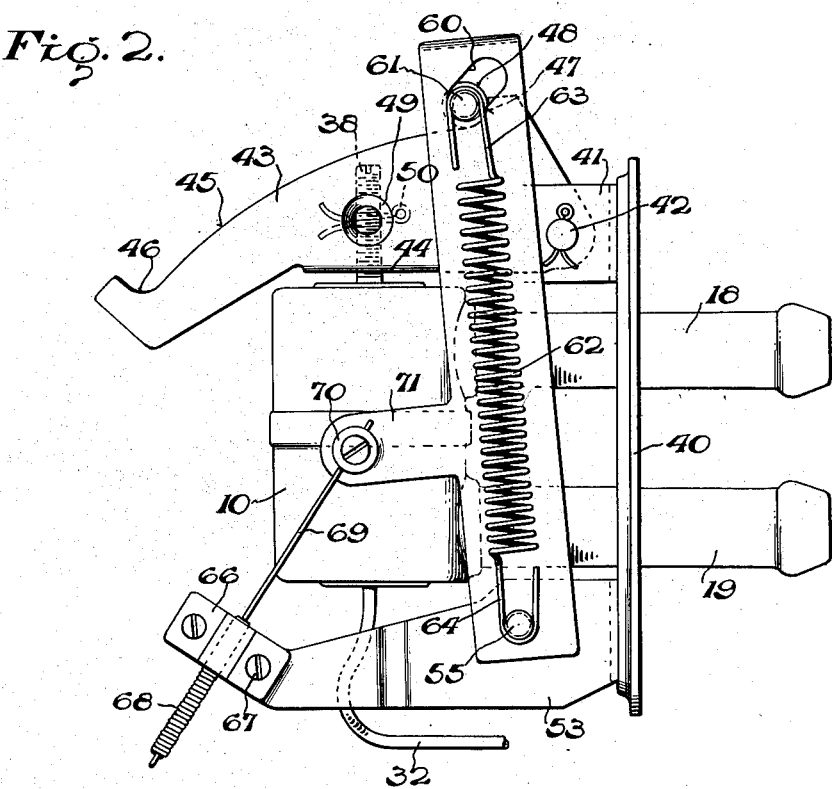
Fig. 2 is a corresponding view of said regulator but illustrating the provision of adjustment at its opposite range of movement.
Figure 4:
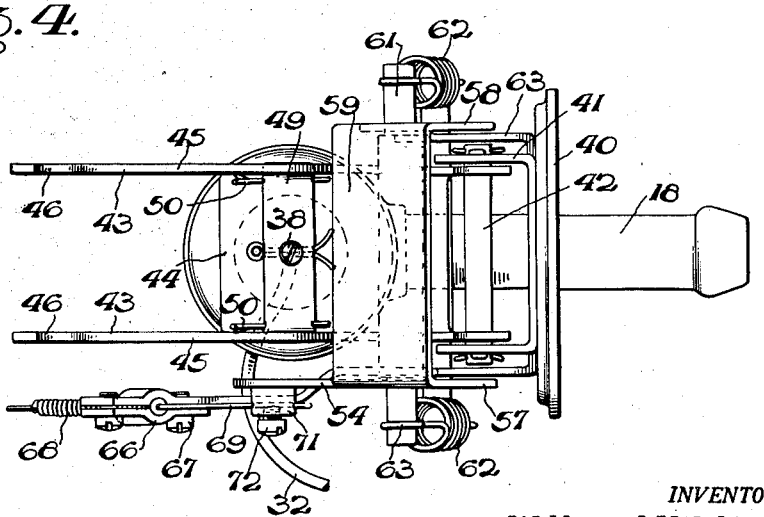
Fig. 4 is a top plan view of said regulator.
Figures 5, 6:
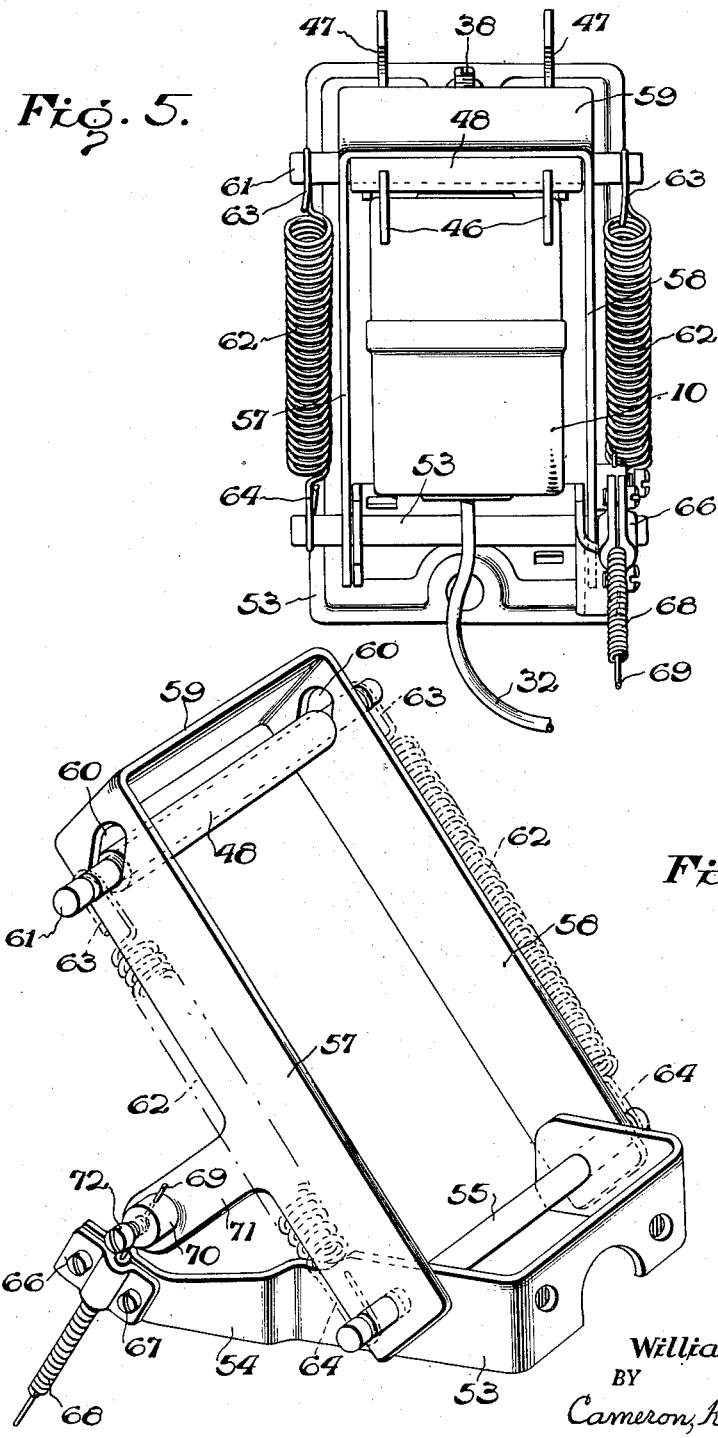
Fig. 5 is a side elevation of the regulator as viewed from the left of Fig. 1.
Fig. 6 is a perspective view of the manually operable member for effecting adjustment detached from the regulator.

In the embodiment shown in Figs. 1–6, the regulator proper includes a housing 10 of any suitable size, construction and material, here shown (Fig. 3) as composed of a pair of cup-shared members 11 and 12 which may be secured together in any suitable way as by brazing or soldering. Interiorly of said housing 10 is a partition 13, which may be formed integrally with one of the housing members but is here shown as clamped in position between the two members of the housing. Partition 13 is formed in any suitable way so as to provide a port 14 and valve seat 15, said partition 13 dividing the interior of the housing 10 into two chambers 16 and 17. Suitably secured in the walls of said chambers 16 and 17 are conduits 18 and 19 formed in any suitable way so as to be appropriately connected into the system through which the heating medium is circulated to and from the heat interchanger. In the form shown, conduit 18 constitutes the inlet to the housing 10 and conduit 19 constitutes the outlet therefrom.

A thermostatically operated valve of any suitable construction is disposed in chamber 17. As here illustrated, an expansible and collapsible chamber 20 is formed by a tubular corrugated expansible and collapsible wall or bellows 21 having formed integrally therewith or suitably attached thereto a stationary end wall 22 which is secured to the wall of the housing 10 in any suitable way, being shown as soldered or brazed into an opening 23 formed in said wall. The opposite and movable end of bellows 21 has secured thereto in any suitable way a valve member for cooperation with the valve seat 15. As illustrated, a cup-shaped member 24 is suitably sealed to the end of the bellows 21 at one extremity, and suitably attached to a block 25 at its opposite extremity, said block projecting into the chamber 20 and forming by itself, or by means of a tubular extension 26 suitably secured thereto, a stop for cooperation with the end wall 22 in limiting the extent of compression of the bellows 21. Secured to said block 25 is a valve disk 27 of any suitable material, for example, rubber or neoprene. As illustrated, block 25 has an interiorly threaded bore 28 which receives a post 29 formed to provide a shoulder 30 between which, with the interposition of a washer 31 if desired, and the block 25, said valve disk 27 is clamped. Communication with the interior of the chamber 20 is a tube 32 of any suitable size, length and construction which may be disposed at any suitable location where it is subjected to the temperature of the space being heated. The expansible and collapsible chamber 20 and its communicating tube are charged with any suitable thermosensitive fluid so that the chamber 20 may be expanded and contracted as the temperature to which the tube is subjected rises and walls. Chamber 20 with its communicating tube will hereinafter be referred to as the thermostat.

The other chamber 16 within said housing 10 contains a second tubular corrugated expansible and collapsible wall or bellows 33 of the same effective area as the bellows 21 so that the pressure of the fluid flowing through the housing 10 will effect a balanced action on said opposed bellows. As shown, one end of the bellows 33 is hermetically sealed in any suitable way into an opening 34 formed in the wall of the housing, the interior of said bellows being open to the atmosphere. The opposite and movable end of bellows 33 is sealed in any suitable way to the post 29, being shown as sealed to a cup-shaped member 35 which in turn is secured as by soldering or brazing to a shoulder on said post. The end of post 29 within the bellows 33 is provided with a spherical socket 36 and engaged in said socket is the spherical head of a link 37 which thereby has a ball and socket connection with the post 29. The opposite end 38 of said link 37 is threaded for a purpose to be explained.

The regulator as so far described may be mounted on any suitable base plate 40 which carries suitably attached thereto a rectangularly U-shaped bracket 41 in which is secured a pivot pin 42. Pivotally mounted on pivot pin 42 are a pair of arms 43 which are symmetrically disposed with respect to the axis of the thermostat and which may be connected together to form a unit in any suitable way as by one or more transverse members 44 extending between and suitably attached to or formed integrally with said arms 43. Each of said arms 43 has a circularly arcuate edge 45 which at its opposite extremities terminates in dwells 46 and 47. The two arms 43, with their arcuate edges 45 and dwells 46 and 47, and the cross connection 44 constitute a single member, which will hereinafter be referred to as the track member, that is pivoted for movement around the pivot pin 42, and if desired, the arms 43 and transverse connecting member 44 may be formed as one integral piece which may be conveniently stamped up from sheet metal.

This track member also carries means for connecting said member to the threaded extremity 38 of the link 37. As shown, a rod 49 extends between the two arms 43 and is secured against dislodgment therefrom in any suitable way, as by cotter pins 50, and said rod 49 has a threaded opening 51 extending therethrough in alignment with the post 29 so as to receive the threaded extremity 38 of the link 37. As the post 29 is attached to the movable end wall of the expansible and collapsible chamber 20 as well as the valve member 27, movements of said movable end wall are transmitted through the post 29 to the link 37 and thence to said track member by means of the connection of said link to the rod 49, the ball and socket joint 36 between the post and link providing for such angular movement of the link with respect to the post as may be required by the movement of the track member about its pivot 42.

Also mounted on the base plate 40 in any suitable way at the opposite end of the housing 10 from bracket 41 is a second rectangularly U-shaped bracket 53, one of the arms of which, as the arm 54 (see Fig. 4), being made longer than the other. Mounted in said U-shaped bracket 53 is a pivot pin 55, and pivotally mounted on pin 55 is a tension applying member which may project between the arms of said track member but is here shown as a rectangularly U-shaped member embracing said track member and composed of a pair of side arms 57 and 58 connected at their outer ends by a transverse member 59 integral therewith or suitably attached thereto. This member, hereinafter referred to as the tension applying member, may be formed from sheet metal bent to form. Adjacent their outer extremities the arms 57 and 58 are provided with aligned slots 60, the long axis of said slots being, when in the position shown in Fig. 3, substantially a segment of an arc with center at 42. Mounted in said aligned slots 60 is a rod 61, which preferably carries a roller 48 having rolling contact with the arcuate edges 45 of the aforesaid track member. Rod 61 with its roller 48 is held in contact with said arcuate edges 45 under resilient tension, and to this end and to provide balanced forces, a pair of coil springs 62 have their opposite ends 63 and 64 wrapped around or otherwise suitably engaged with the rod 61 and the pivot pin 55.

Said arcuate edges 45 of said track member are so shaped and arranged that they are substantially concentric with the axis of the pivot pin 55 so that when the tension applying member is moved to traverse the rod 61 from dwell 46 to dwell 47 or vice versa, said rod 61 with its roller 48 moves along and in contact with the arcuate edges 45, substantially concentrically with respect to the axis of pivot pin 55, thereby applying the tension of said springs 62 to said track member without substantial change in the tension of said springs. However, as will be observed, the tension applying member in all positions applies the tension of said springs 62 to said track member but at different distances from the pivotal axis 42 of said track member so that a variable load, varying with the distance of the pin 61 from the pivot 42, is applied to the expansible and collapsible vessel 20 by said track member acting through the rod 49, link 37 and post 29.

Any suitable means for moving the tension applying member from one extremity to the other extremity of its path of movement, or to any desired intermediate points therein, may be operatively connected in any suitable way to said member. In the preferred construction a Bowden wire is used for moving said member, and to this end as illustrated the long arm 54 of bracket 53 is provided adjacent its extremity with a clamping plate 66 which may be secured to said arm 54 in any suitable way, as by a plurality of set screws, bolts and nuts, etc., as shown at 67. Thereby the flexible casing 68 of the Bowden wire may be rigidly secured to the stationary bracket 53 while the wire 69 which projects beyond said casing 68 and is suitably secured to the tension applying member, as to a perforated post 70, attached to an extension 71 on arm 57, with set screw 72. The opposite end of the Bowden wire may be mounted in any suitable way at any desired location where it is convenient to the driver of the car or whoever is supposed to manipulate the same.

The temperature regulator as described is connected into the system for circulating the heating medium by connecting the inlet for the medium to the conduit 18 and the outlet leading through the heat exchanger to the conduit 19. When the valve member 27 is unseated the heated medium will therefore flow through the conduit 18 into the chamber 16, and thence through the valve port 14 into the chamber 17, and out through the conduit 19. With the before mentioned tube suitably mounted in the space whose temperature is to be controlled the thermostat will respond to variations in temperature in said space, causing chamber 20 to expand and contract with increasing and decreasing temperature to move the valve member 27 toward and away from the valve seat 15 to decrease and increase, respectively, the flow of heating medium. During such operation fluctuations in the pressure of said medium are ineffective to alter the position of the valve member because said pressures are applied to balanced areas constituted by the bellows 21 and 33.

Expansions and contractions of said chamber 20 are transmitted through the post 29 and link 37 to the track member, causing the latter to pivot around its axis 42. During such movements the rod 61 with its roller 48, which is held in contact with said track member by the tension of the springs 62, may move upwardly and downwardly in the slots 60 without altering the position of the tension applying member, the tension of said springs 62 applying a load to the chamber 20 through said track member and its connections to said chamber. Thus the valve member moves toward open position under the tension of springs 62 as said chamber 20 contracts with decreasing temperature, while expansions of said chamber 20 move the valve member toward closed position against the tension of said springs 62. For any given location of said tension applying member the temperature regulator therefore functions in the manner well understood in the art to vary the flow of heating medium in conformity with the response of the thermostat.

To adjust the regulator the Bowden wire mechanism is actuated to move the tension applying member about its pivot 55, thereby moving the rod 61 with its roller 48 along the arcuate edges 45. Said arcuate edges are preferably of such length that the maximum range of temperature likely to be desired can be effected. Thus the dwells 46 and 47 may be so spaced that the load imposed on the thermostat will maintain temperatures, depending upon the location of said tension applying member, through a range of say 40° F. When the roller 48 is at one extremity of its range of movement, to wit, in the dwell 46, said member cannot move farther in an anticlockwise direction. In this position the tension of the springs 62 is applied at a maximum moment around the pivotal axis 42 to the link 37 and post 29. At the opposite extremity of the arcuate edges 45, to wit, at dwell 47, said springs 62 are applying a minimum moment about the pivot 42 to the link 37 and post 29. At intervening points along the arcuate edges 45 proportional intermediate moments are being applied to link 37 and post 29. As the edges 45 are substantially concentric with the pivot pin 55 movement of the roller 48 along said arcuate edges does not substantially change the tension of the spring 62 and therefore the roller 48 can be moved from one extremity to the other of its range of movement under a substantially constant force. Thereby, by applying a pull or a push to the Bowden wire, roller 48 may be moved from any point in its path of movement to any other point in its path of movement to increase or decrease the moment exerted by the springs 62 on the expansible and collapsible chamber 20.

If it is desired to put the regulator out of operation, the Bowden wire mechanism may be operated when the roller 48 reaches the dwell 47 to move the tension applying member a small additional distance in the clockwise direction. This causes the roller 48 acting on the outer wall of the dwell 47, to swing the track member around its pivot 42 through the slight additional distance required to positively move the valve member 27, through link 37 and post 29, into engagement with its seat 15 and thereby prevent further circulation of the heating medium.

The embodiment of the invention shown in Figs. 7 through 13 includes most of the elements above described rearranged for compactness and protection of the elements and operates and functions in substantially the same way as described above for the embodiment of Figs. 1-6. Referring now more particularly to Figs. 7-13 it is there seen that the unit is housed in an open ended casing comprising side walls 75 and 76 having a top 77 and in turned flanges 78. This housing is secured to base plate 40 by any suitable means here shown as by screws 79 passing through plate 40 and through flanges 78. Top 77 is cut away at 80 and side walls 75 and 76 are cut away continuously therewith as at 81 and 82 respectively to form an aperture within which the tension applying member may move.

The track member comprising arms 43 and bottom 44 is mounted on pivot 42 which is carried by side walls 75 and 76. Bellows 21 is suitably secured to base plate 40 as by expansion through aperture 83 therein and stem 37 is rigidly mounted in the top of bellows 21 at 36. Stem 37 in turn passes through a suitable aperture 84 in bottom 44 and is rotatably mounted upon pin 49 which is carried by arms 43. Tube 32 for bellows 21 passes through a suitable opening 85 in side walls 76.

Instead of a through shaft 55, shown in Figs. 1 through 6, upon which arms 57 are rotatably mounted, a pair of studs, which have been numbered 55 for convenience, are employed and are mounted and secured to side walls 75 and 76. The tension applying member made up of arms 57, top 59, springs 62, shaft 61 and roller 48 is identical to that described above save that roller 48 is cut away at 86 to receive the arcuate surfaces 45 of arms 43. Also in this embodiment the Bowden wire 69 is provided with a loop 87 to be received by pin 70.

The valve assembly is located outside of the housing made up of sidewalls 75 and 76, top 77 and base 40 and, as shown in this embodiment, comprises a cylindrical chamber 88 suitably secured to the underside of base plate 40 by bolts 79 and 89. Plate 40 is suitably cut away as at 90 above chamber 88 and bellows 33 passes through this opening and is sealed in and closes the open end of chamber 88. Bellows 33 is suitably secured to the upper end of chamber 88 as by soldering at 91. Conduit 19 is connected to the lower extremity of chamber 88 at 92 and a suitable valve seat 93, cooperating with valve 27, is suitably secured adjacent this point. Conduit 18 opens into chamber 88. Valve 27 is provided with valve stem 94 which passes through bellows 33 with a fluid tight connection at 95. The upper end of valve stem 94 is threaded at 96 and is screwed into a suitably internally threaded plug 97 and is provided with a lock nut 98. Plug 97 is rotatably mounted at 99 in U-shaped bracket 100 which, in turn, is pivotally mounted on shaft 101 carried between arms 43, bottom 44 being cut away as at 102 to receive bracket 100. By loosening lock nut 98 and by rotating plug 97 suitable adjustment of the temperature regulator may be obtained.

Clamping plate 66 for the flexible covering 68 of the Bowden wire is, in this embodiment, mounted upon bracket 103 which is suitably secured to top 77 as by brazing or by welding.

The operation of this embodiment of the present invention is identical to that of Figs. 1-6 except that bellows 21 is not subjected to pressures and temperatures of the water passing through the valve. In the embodiment of the invention disclosed in Figs. 7-13 the sole function of bellows 33 is that of sealing valve stem 94 with respect to chamber 88.

It will therefore be perceived that by the present invention improved adjusting mechanisms for a temperature regulator has been provided which affords a relatively wide range of adjustment through use of a push-pull manually manipulated member, and owing to the length of the arcuate edges 45 and the actuation of the tension applying member by a push-pull movement no nice adjustment is required to predetermine the approximate temperature to be maintained. Furthermore, the force required to move the adjusting mechanism throughout its range of adjustment remains substantially constant, and as the magnitude of this force is determined by the relatively light frictional opposition to movement of the roller along the arcuate edges 45 under the tension of the springs 62, the force involved is sufficiently small so that conventional Bowden wire mechanism may be used satisfactorily. The device is composed of relatively simple parts, the principal ones of which may be readily struck up from sheet metal, and therefore the device is easy and economical to fabricate and assemble so that it may be produced inexpensively without the use of highly skilled labor.

While the embodiments of the invention illustrated on the drawings have been described with considerable particularity, it is to be expressly understood that the invention is not restricted thereto, as the same is capable of receiving a variety of mechanical expressions, as will now be apparent to those skilled in the art, while changes may be made in the details of construction, size, arrangement, proportion, etc., of the parts, and parts illustrated may be replaced by equivalent parts, without departing from the spirit of the invention. Furthermore, while the invention has been particularly illustrated and described as applied to a regulator for automobile heating systems, it will now be apparent to those skilled in the art that it is susceptible to much wider application, being useful wherever a temperature regulator is to be manually manipulated from a distance, particularly if a relatively wide range of adjustment is desirable.

Reference is therefore to be had to the appended claims for a definition of said invention.

What is claimed is:

1. In a temperature regulator of the type characterized including a housing having inlet and outlet connections and means providing a valve port therein, a valve member associated with said port and a thermostat operatively connected to said valve member, means for varying the response of said thermostat to temperature changes including a member providing an arcuate track, a pivot for said track member, connecting means pivotally connected to said thermostat and operatively connected to said track member, a tension applying member including an element movable along said track and having a pivot separate from said first named pivot, said track being substantially concentric with said second named pivot, resilient means cooperating with said tension applying means and acting therethrough to apply tension to said track member and said thermostat, and means for moving said tension applying member to vary the position of said element with respect to the pivot of said track member.

2. In a temperature regulator of the type characterized including a housing having inlet and outlet connections and means providing a valve port therein, a valve member associated with said port and a thermostat operatively connected to said valve member, means for varying the response of said thermostat to temperature changes including a member providing a pair of spaced like arcuate tracks at opposite sides of the axis of said thermostat, a pivot for said track member, a link pivotally connecting said thermostat and track member, a tension applying member having an element movable along said tracks, resilient means cooperating with said tension applying member and acting therethrough to apply tension to said track member and said thermostat, and means for moving said tension applying member to vary the distance of said element from the pivot of said track member.

3. In a temperature regulator of the type characterized including a housing having inlet and outlet connections and means providing a valve port therein, a valve member associated with said port and a thermostat operatively connected to said valve member, means for varying the response of said thermostat to temperature changes including a track member providing a pair of spaced like arcuate tracks at opposite sides of the axis of said thermostat, a pivot for said track member, a link pivotally connecting said thermostat and track member, a tension applying member having an element movable along said tracks, a pivot for said tension applying member separate from said first named pivot, said tracks being substantially concentric with said second named pivot, resilient means cooperating with said tension applying member and acting therethrough to apply tension to said track member and said thermostat, and means for moving said tension applying member to vary the distance of said element from the pivot of said track member.

4. In a temperature regulator of the type characterized including a housing having inlet and outlet connections and means providing a valve port therein, a valve member associated with said port and a thermostat operatively connected to said valve member, means for varying the response of said thermostat to temperature changes including a track member providing a pair of spaced like arcuate tracks at opposite sides of the axis of said thermostat, a pivot for said track member, a link pivotally connected to said thermostat and operatively connected to said track member, a tension applying member having an element movable along said tracks, resilient means cooperating with said tension applying member and acting therethrough to apply tension to said track member and said thermostat, and means for moving said tension applying member to vary the distance of said element from the pivot of said track member including a Bowden wire operatively connected to said tension applying member.

5. In a temperature regulator of the type characterized including a housing having inlet and outlet connections and means providing a valve port therein, a valve member associated with said port and a thermostat including an expansible and collapsible chamber operatively connected to said valve member, means for varying the response of said thermostat to temperature changes including a track member providing an arcuate track, a pivot for said track member, means operatively connecting said track member to said thermostat, a tension applying member carrying an element movable along said track, resilient means cooperating with said tension applying member and acting therethrough to apply tension to said track member and said thermostat, means for moving said tension applying member to vary the distance of said element with respect to the pivot of said track member, and an expansible and collapsible wall having the same effective area as said chamber and providing a sealing wall around the connection between said thermostat and said track member.

6. In a temperature regulator of the type characterized including a housing having inlet and outlet connections and means providing a valve port therein, a valve member associated with said port and a thermostat operatively connected to said valve member, means for varying the response of said thermostat to temperature changes including a track member providing a pair of spaced like arcuate tracks on opposite sides of the axis of said thermostat, a pivot for said track member, operative connections between said track member and said thermostat, a tension applying member including a pair of arms and having an element movable along said tracks, said arms having slots in which said element is movably mounted, a pivot for said tension applying member separate from said first named pivot, said tracks being substantially concentric with said second named pivot, resilient means cooperating with said tension applying member and acting therethrough to apply tension to said track member and said thermostat, and means for moving said tension applying member to vary the distance of said element from the pivot of said track member.

7. A temperature regulator of the type characterized including a base, a housing having side walls and a cutaway top secured to said base, a second housing secured to said base having inlet and outlet connections and means providing a valve port therein, a valve member associated with said port, a valve stem extending through said base, means for sealing said stem and said base, a thermostat carried by said base, a pivotally mounted member carried by said side walls above said thermostat and providing a track extending through said cutaway top, means for connecting said thermostat and said pivotally mounted member, a tension applying member movable along said track and having pivotal mountings on said sides separate from the pivot of said track member, said track being substantially concentric with the pivot of said tension applying member, resilient means cooperating with said tension applying member and acting therethrough to apply to said track member variable moments of tension about the pivot thereof, and means for moving said tension applying member along said track.

8. In a temperature regulator of the type characterized including a housing having inlet and outlet connections and means providing a valve port therein, a valve member associated with said port and a thermostat operatively connected to said valve member, means for varying the response of said thermostat to temperature changes including a pivotally mounted member providing a curved track, an internally threaded member rotably and pivotally mounted on said pivotally mounted member, a threaded valve stem for said valve adjustably mounted in said internally threaded member, an expansible and collapsible wall sealing said valve stem and said housing, a tension applying member movable along said track and having a pivotal mounting separate from the pivot of said track member, said track being substantially concentric with the pivot of said tension applying member, resilient means cooperating with said tension applying member and acting therethrough to apply to said track member moments about the pivot thereof, and means for moving said tension applying member along said track.

9. In a temperature regulator of the type characterized including a housing having inlet and outlet connections and means providing a valve port therein, a valve member associated with said port and a thermostat operatively connected to said valve member, means for varying the response of said thermostat to temperature changes including a pivotally mounted member providing a curved track, an internally threaded member, a bracket on which said internally threaded member is rotatably mounted, means for pivotally connecting said bracket to said pivotally mounted member, a threaded valve stem for said valve mounted in said internally threaded member, means for sealing said valve stem where it enters said housing, a tension applying member movable along said track and having a pivotal mounting separate from the pivot of said track member, said track being substantially concentric with the pivot of said tension applying member, resilient means cooperating with said tension applying member and acting therethrough to apply to said track member moments about the pivot thereof, and means for moving said tension applying member along said track.

10. In a temperature regulator of the type characterized including a housing having inlet and outlet connections and means providing a valve port therein, a valve member associated with said port and a thermostat operatively connected to said valve member, means for varying the response of said thermostat to temperature changes including a movable member providing an arcuate track and operatively connected to said thermostat, a thrust element movable along said track, resilient means operatively connected to said thrust element to exert a force of preselected magnitude thereon for biasing said element into engagment with said track and toward the axis thereof, and means for moving said element along said track.

WILLIAM M. WATKINS, JR.

REFERENCES CITED

The following references are of record in the file of this patent:

UNITED STATES PATENTS

| Number | Name | Date |
|---|---|---|
| 1,556,639 | Sheer | Oct. 13, 1925 |
| 1,876,822 | Mansure | Sept. 13, 1932 |
| 2,040,109 | Spence | May 12, 1936 |
| 2,111,230 | Toussaint | May 15, 1938 |
| 2,140,486 | Turner | Dec. 13, 1938 |
| 2,155,233 | Mantz | Apr. 18, 1939 |
| 2,231,696 | Wolfe | Feb. 11, 1941 |